United States Patent
Kim et al.

(10) Patent No.: US 9,504,007 B2
(45) Date of Patent: Nov. 22, 2016

(54) TERMINAL, METHOD FOR MANAGING THEREOF, BASE STATION AND METHOD FOR MANAGING THEREOF

(75) Inventors: Won-Ik Kim, Daejeon (KR); Juhee Kim, Daejeon (KR); Soojung Jung, Daejeon (KR); Eunkyung Kim, Seoul (KR); Sung Cheol Chang, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 655 days.

(21) Appl. No.: 12/821,661

(22) Filed: Jun. 23, 2010

(65) Prior Publication Data

US 2010/0331018 A1    Dec. 30, 2010

(30) Foreign Application Priority Data

Jun. 24, 2009  (KR) .................. 10-2009-0056594
Jul. 14, 2009  (KR) .................. 10-2009-0063997
Jun. 16, 2010  (KR) .................. 10-2010-0057246

(51) Int. Cl.
*H04W 24/00* (2009.01)
*H04W 68/00* (2009.01)
*H04W 60/00* (2009.01)
*H04W 84/04* (2009.01)

(52) U.S. Cl.
CPC ............ *H04W 68/00* (2013.01); *H04W 60/00* (2013.01); *H04W 84/045* (2013.01)

(58) Field of Classification Search
CPC ................... H04W 84/045; H04W 84/047
USPC .................. 455/456.1, 456.5, 456.6, 458
See application file for complete search history.

(56) References Cited

U.S. PATENT DOCUMENTS

2007/0293244 A1* 12/2007 Lee et al. ............... 455/456.5
2010/0279684 A1* 11/2010 Salkintzis .................. 455/434

OTHER PUBLICATIONS

Fundamentals of WiMAX Understanding Broadband Wireless Networking, by Jeffrey G. Andrews, Arunabha Ghosh, Rias Muhamed © 2007 pp. 319-333.*
Printout from IEEE 802.16 workgroup website outlining submission guidelines (7 pages). Printed on Mar. 23, 2013.*
Fundamentals of WiMAX Understanding Broadband Wireless Networking, by Jeffrey G. Andrews, Arunabha Ghosh, Rias Muhamed © 2007 p. 250.*
Shkumbin Hamiti, IEEE 802.16m System Description Document, IEEE 802.16m-081003r9a, May 31, 2009.
Won-Ik Kim et al., Idle Mode Operation for Femtocell BS in IEEE 802.16m Amendment, IEEE 202.16m, Jul. 6, 2009.

* cited by examiner

*Primary Examiner* — Joshua Schwartz
(74) *Attorney, Agent, or Firm* — Jefferson IP Law, LLP

(57) ABSTRACT

A method for managing a terminal operated in an idle state is provided. The method includes entering a femto cell, determining whether a femto base station managing the femto cell has the same paging group as a macro base station managing a macro cell overlapping the femto cell, transmitting a first ranging code triggering a paging enable state to the femto base station if it is determined that the paging group is the same as the determination result, and receiving a paging message from the femto base station.

12 Claims, 4 Drawing Sheets

TERMINAL, METHOD FOR MANAGING THEREOF, BASE STATION AND METHOD FOR MANAGING THEREOF

PRIORITY

This application claims the benefit under 35 U.S.C. §119(a) of Korean Patent Applications filed on Jun. 24, 2009, Jul. 14, 2009, and Jun. 16, 2010 in the Korean Intellectual Property Office and assigned Serial Nos. 10-2009-0056594, 10-2009-0063997 and 10-2010-0057246, respectively, the entire disclosures of each of which are hereby incorporated by reference.

BACKGROUND OF THE INVENTION

1. Field of the Invention

The present invention relates to a terminal. More particularly, the present invention relates to a terminal and a base station, and a method for managing the terminal and the base station.

2. Description of the Related Art

A femto cell is a region where a wireless communication service is provided within a range, for example, 30 m. A femto base station that manages the femto cell is installed in an office or a home, and uses frequency equal to or different from other cells that target an area having a range more than the range of the femto cell. The femto cell may include a macro cell, which is managed by a macro base station, that manages a region larger than the femto cell.

The femto base station periodically transmits a paging message in order to support a terminal operated in an idle mode within the femto cell. Even though the femto base station provides limited service to terminals, in an environment where a plurality of femto cells overlap with each other in one macro cell, the terminals belonging to the same paging group may periodically transmit the paging message. More particularly, it is more likely for the femto cell not to have a terminal that is an idle mode in a cell. However, the femto base station should periodically broadcast the paging message to all the terminals in the idle mode belonging to the same paging group. This scheme is non-efficient due to excessively occurring paging overhead and wasted radio resource.

Therefore, a need exists for a method of a femto base station for transmitting a paging message only to a terminal in an idle mode existing in a femto cell and for performing a location update according to a change in a paging group when the terminal in the idle mode enters a macro cell which causes a paging overhead.

SUMMARY OF THE INVENTION

An aspect of the present invention is to address at least the above-mentioned problems and/or disadvantages and to provide at least the advantages described below. Accordingly, an aspect of the present invention is to provide a terminal, a method for managing a terminal, a base station, and a method for managing a base station that flexibly transmits a paging message to a terminal in an idle mode of a femto base station.

In accordance with an aspect of the present invention, a method for managing a terminal operated in an idle state is provided. The method includes entering a femto cell, determining whether a femto base station managing the femto cell has the same paging group as a macro base station managing a macro cell overlapping the femto cell, transmitting a first ranging code triggering a paging enable state to the femto base station if it is determined that the paging group is the same as the determination result, and receiving a paging message from the femto base station.

The method for managing a terminal may further include transmitting a second ranging code for location update to the femto base station after transmitting the first ranging code.

The method for managing a terminal may further include transmitting the ranging code for the location update to the femto base station if it is determined that the paging group is not the same as the determination result.

The determination may be performed based on a paging group identifier.

In accordance with another aspect of the present invention, a method for managing a terminal operated in an idle state is provided. The method includes entering a femto cell, receiving a paging enable indicator indicating a paging state of a femto base station from the femto base station managing the femto cell, transmitting a ranging code for location update to the femto base station, and receiving a paging message from the femto base station.

In accordance with still another aspect of the present invention, a method for managing a femto base station managing a femto cell is provided. The method includes receiving a first ranging code triggering a paging enable state from a terminal operated in an idle state, shifting a paging enable state after receiving the first ranging code, and broadcasting a paging message to the terminal.

The method for managing a femto base station may further include activating a paging enable timer after receiving the first ranging code.

The method for managing a femto base station may further include shifting the paging enable state of the femto base station to a paging disable state after the paging enable timer ends.

The method for managing a femto base station may further include: receiving a second ranging code for a location update from the terminal after receiving the first ranging code, and updating the paging enable timer.

In accordance with a further aspect of the present invention, a method for managing a femto base station managing a femto cell is provided. The method includes transmitting a paging enable indicator indicating a paging state of the femto base station to a terminal operated in an idle state, receiving a ranging code for a location update from the terminal, and broadcasting a paging message to the terminal.

In accordance with yet another aspect of the present invention, a base station managing a femto cell is provided. The base station includes a ranging code receiver for receiving a first ranging code triggering a paging enable state from a terminal operated in an idle state, a state changing unit for changing the state of the base station to a paging enable state after receiving the first ranging code, and a paging message broadcasting unit for broadcasting a paging message to the terminal.

The base station managing a femto cell may further include a timer setting unit for activating a paging enable timer, wherein the state changing unit may change the state of the base station to the paging enable state when the paging enable timer ends.

The ranging code receiver may further receive a second ranging code for a location update from the terminal.

In accordance with another aspect of the present invention, a terminal operated in an idle mode is provided. The terminal includes a determination unit for determining whether a femto base station managing the femto cell into which the terminal enters has the same paging group as a macro base station managing a macro cell overlapping the femto cell, a ranging code transmitter for transmitting a first ranging code triggering a paging enable state to the femto base station if it is determined that the paging group is the same as the determination result of the determination unit, and a receiver for receiving a paging message from the femto base station.

The ranging code transmitter may further transmit a second ranging code for a location update to the femto base station.

The ranging code transmitter may transmit the ranging code for the location update to the femto base station if it is determined that the paging group is not the same as the determination result of the determination unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the following description, a terminal may designate a Mobile Station (MS), a Mobile Terminal (MT), a Subscriber Station (SS), a Portable Subscriber Station (PSS), a User Equipment (UE), an Access Terminal (AT), and the like, and may include entire or partial functions of the terminal, the MT, the SS, the PSS, the UE, the AT, and the like.

Also, in the following description, a Base Station (BS) may designate an Access Point (AP), a Radio Access Station (RAS), a nodeB, an evolved NodeB (eNodeB), a Base Transceiver Station (BTS), a Mobile Multihop Relay (MMR)-BS, and the like, and may include entire or partial functions of the AP, the wireless access station, the nodeB, the eNodeB, the BTS, the MMR-BS, and the like.

Hereinafter, a method for managing a terminal and a method for managing a base station according to an exemplary embodiment of the present invention will be described in detail below with reference to the accompanying drawings.

Figure 1:
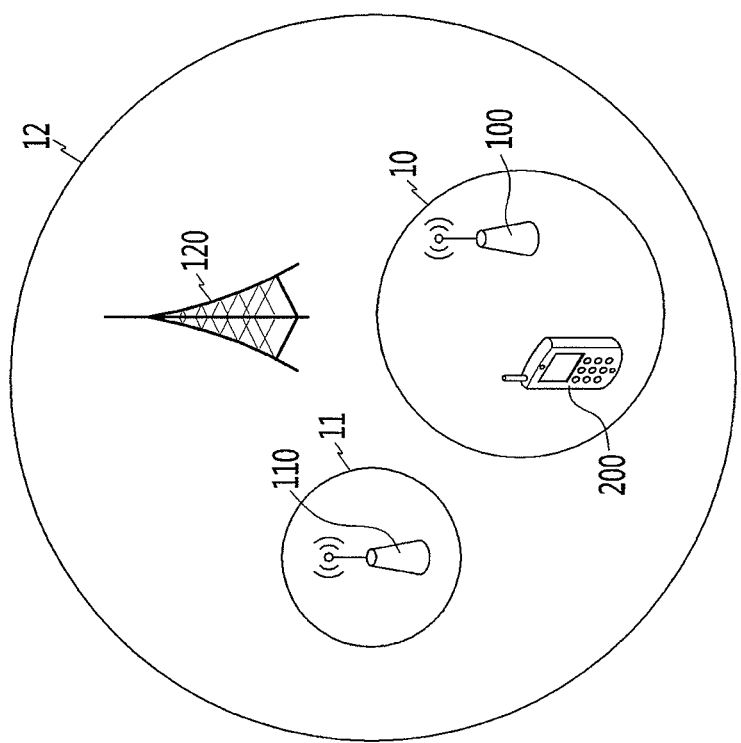
FIG. 1 is a diagram schematically illustrating a mobile communication system according to an exemplary embodiment of the present invention.

FIG. 1 is a diagram schematically illustrating a mobile communication system according to an exemplary embodiment of the present invention.

Referring to FIG. 1, a mobile communication system includes femto base stations 100 and 110, a macro base station 120, and a terminal 200.

The femto base stations 100 and 110 provide a wireless communication service within, for example, a range of 10 cm to 30 cm. The femto base stations 100 and 110 are installed in a shadow region with propagation issues from other cells, for example, a home or a building, to secure quality of a mobile communication service. Each of the femto base stations 100 and 110 manages femto cells 10 and 11. Although the exemplary embodiments of the present invention are implemented with the femto base stations 100 and 110 and the femto cells 10 and 11, it should be understood that the term femto is not limited to a dictionary definition and includes a range from a femto base station to a femto cell having a larger unit or a smaller unit.

The femto base stations 100 and 110 are a backbone network and may use a public Internet network that is mainly used in a wired Internet network.

The macro base station 120 manages a macro cell 12. The macro cell 12 includes the femto cells 10 and 11 and may have a larger region than the femto cells 10 and 11. It should be further understood that the term macro is not limited to a dictionary definition.

The macro base station 120 and the femto base stations 100 and 110 may be connected to each other by a wired network and the macro base station 120 may manage the femto base stations 100 and 110 connected thereto.

The terminal 200 is an endpoint of a wireless channel and is connected to the femto base stations 100 and 110 and the macro base station 120 to transmit and receive data.

Hereinafter, a method for managing a terminal and a method for managing a base station will be described in detail below with reference to FIG. 2.

Figure 2:
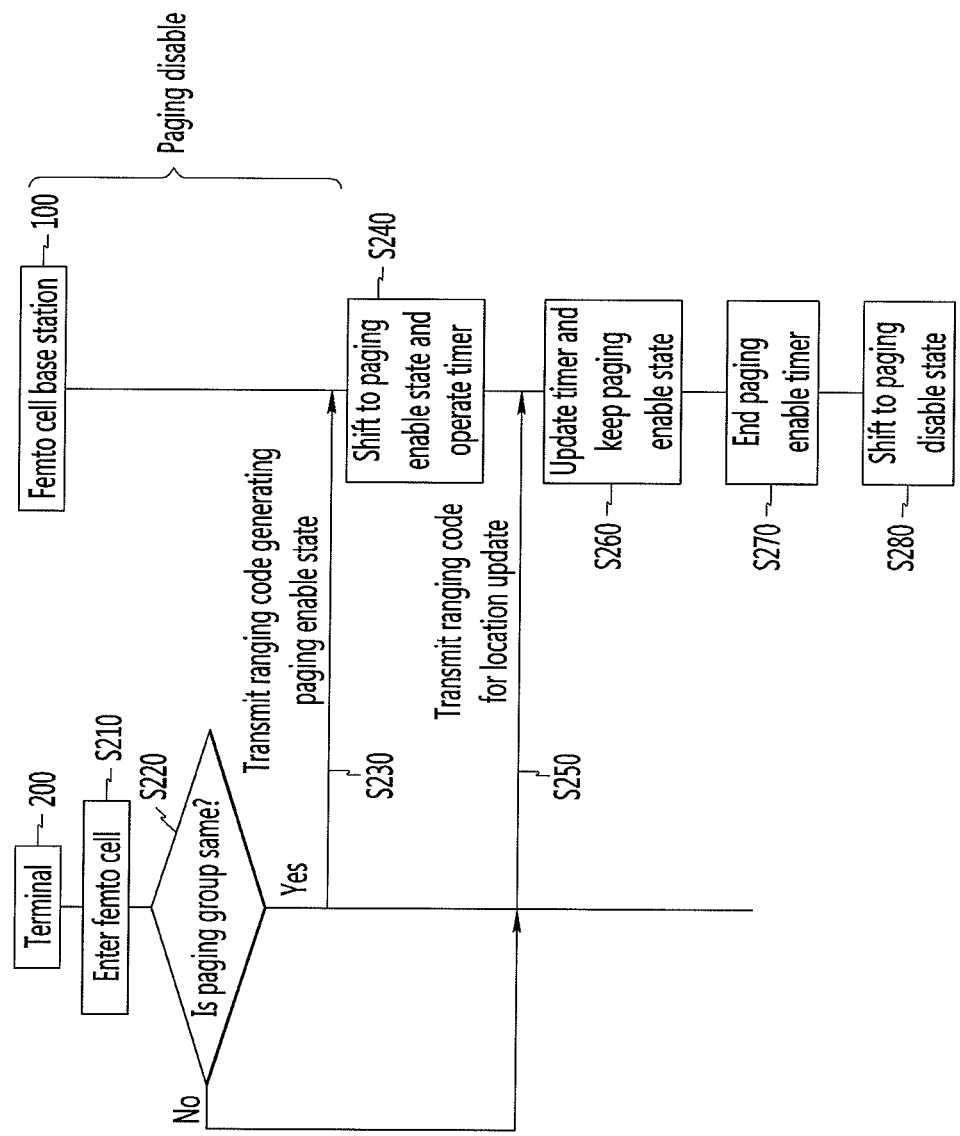
FIG. 2 is a flowchart illustrating an operation procedure of a terminal and a base station according to an exemplary embodiment of the present invention.

FIG. 2 is a flowchart illustrating an operation procedure of a terminal and a femto cell base station according to an exemplary embodiment of the present invention.

Referring to FIG. 2, the terminal 200 operated in an idle mode enters a femto cell 10 in step S220. The terminal 200 determines whether the femto base station 100 is the same paging group as a macro base station 120 overlapping therewith in step S220. The determination on whether the femto base station 100 is the same paging group may be performed based on whether the paging group identifier is the same.

If it is determined in step S220 that the paging group is the same, the terminal 200 entering the femto cell 10 transmits a ranging code triggering a paging enable state to the femto base station 100 in step S230. The paging enable state denotes a state where the femto base station 100 may transmit a paging message even when only one terminal 200 operated in an idle mode enters the femto cell 10. Meanwhile, when the terminal 200 is not in the idle mode in the femto cell 10, the femto base station 100 may be in a paging disable state in which the femto base station 100 cannot transmit the paging message called a paging disable state.

The ranging code triggering the paging enable state is first transmitted if it is determined that the paging group is the same whenever the terminal 200 in the idle mode enters the femto cell 10.

The femto base station 100 receiving the ranging code triggering the paging enable state shifts the paging disable state to the paging enable state and operates a paging enable timer in step S240. Thereafter, the femto base station 100 broadcasts the paging message to the terminal 200.

If the femto base station 100 receiving the ranging code triggering the paging enable state is already in the paging enable state, the femto base station 100 resets the paging enable timer to 0 to restart, thereby continuously maintaining the paging enable state.

In contrast, if it is determined in step S220 that the paging group is not the same, the terminal 200 transmits the ranging code for a location update to the femto base station 100 after the idle mode ends in step S250. Herein, the ranging code for the location update is a ranging code for the femto base station 100 to determine whether the terminal 200 in the idle mode exists in the femto cell 10.

The femto base station 100 receiving the ranging code for the location update updates the paging enable timer and continuously maintains the paging enable state in step S260.

Thereafter, when the paging enable timer ends in step S270, the femto base station 100 is shifted to the paging disable state in step S280. When the femto base station 100 is shifted to the paging disable state, the femto base station 100 before receiving the ranging code triggering the paging enable state, does not broadcast the paging message.

If the terminal 200 in the idle mode does not transmit the ranging code for triggering the paging enable state, the terminal 200 transmits the ranging code for the location update to the femto base station 100 after the idle mode timer ends. A delay time is generated until the idle mode timer ends. Therefore, when the terminal 200 transmits the ranging code triggering the paging enable state as soon as it enters the femto cell 10, the femto base station 100 may prevent the occurrence of the delay time that does not broadcast the paging message before the idle mode timer ends.

In contrast, if it is determined in step S220 that the paging group is not the same, i.e., the femto base station 100 has a paging group identifier different from the overlapped macro base station 120, even though the terminal 200 in the idle mode enters the femto cell 10, the terminal 100 does not transmit the ranging code triggering the paging enable state. In this case, the terminal 200 transmits the ranging code for the location update as soon as it recognizes that the paging group of the femto base station 100 is different from the paging group of the terminal 200 in step S250. Therefore, the femto base station 100 may be shifted to the paging enable state after receiving the ranging code for the location registration and does not generate the delay time.

Meanwhile, the femto base station 100 may periodically transmit the paging enable indicator indicating its own paging state to the terminal 200. At this time, the terminal 200 that enters the femto cell 10 by selecting the femto base state 100 in the paging enable state does not transmit the ranging code triggering the paging enable state to the femto base station 100. The paging enable indicator may be included in a Secondary Super Frame Header (S-SFH).

Hereinafter, the femto base station 100 according to an exemplary embodiment of the present invention will be described in more detail below with reference to FIG. 3.

Figure 3:
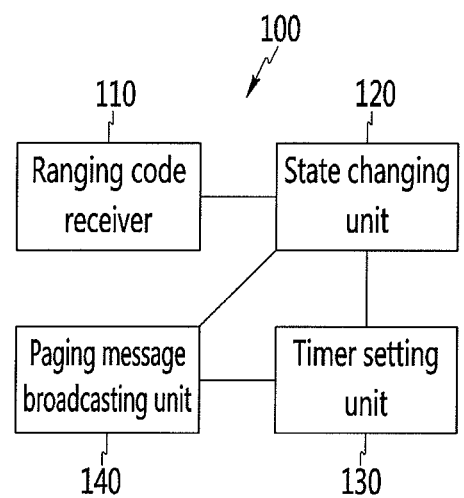
FIG. 3 is a block diagram schematically illustrating a femto base station according to an exemplary embodiment of the present invention.

FIG. 3 is a block diagram schematically illustrating a femto base station according to an exemplary embodiment of the present invention.

Referring to FIG. 3, the femto base station 100 includes a ranging code receiver 110, a state changing unit 120, a timer setting unit 130, and a paging message broadcasting unit 140.

The ranging code receiver 110 receives a ranging code triggering a paging enable state or a paging code for a location update from a terminal 200.

The state changing unit 120 changes the state of the femto base station 100 to the paging enable state when the ranging code receiver 110 receives the ranging code triggering the paging enable state or the paging code for the location update from the terminal 200.

The timer setting unit 130 activates a paging enable timer when the state changing unit 120 changes the state of the femto base station to the paging enable state. Meanwhile, the state changing unit 120 changes the state of the femto base station 100 to a paging disable state when the paging enable timer ends.

The paging message broadcasting unit 140 broadcasts a paging message to the terminal 200 when the state changing unit 120 changes the state of the femto base station 100 to the paging enable state.

Hereinafter, the terminal 200 according to an exemplary embodiment of the present invention will be described in detail below with reference to FIG. 4.

Figure 4:
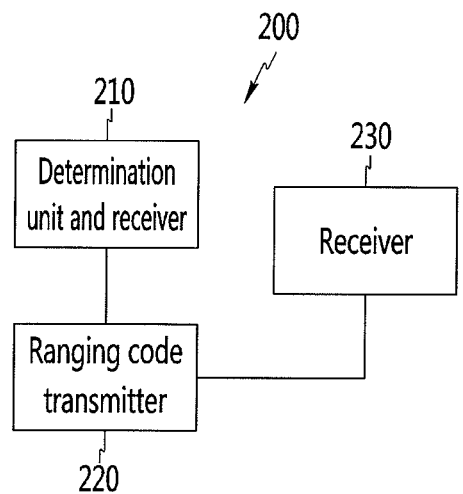
FIG. 4 is a block diagram schematically illustrating a terminal according to an exemplary embodiment of the present invention.

FIG. 4 is a block diagram schematically illustrating a terminal according to an exemplary embodiment of the present invention.

Referring to FIG. 4, the terminal 200 includes a determination unit and receiver 210, a ranging code transmitter 220, and a receiver 230.

When the terminal 200 enters a femto cell 10, the determination unit and receiver 210 determines whether a paging group of a femto base station 100 in a femto cell 10 is the same as the paging group of a macro base station 120.

The ranging code transmitter 220 transmits a ranging code triggering a paging enable state to the femto base station 100 when the determination unit and receiver 210 determines that the paging group is the same. In addition, the ranging code transmitter 220 transmits the ranging code for a location update to the femto base station 100 when the determination unit and receiver 210 determines that the paging group is not the same.

The receiver 230 receives the paging message from the femto base station 100 after the femto base station 100 is shifted to the paging enable state.

According to exemplary embodiments of the present invention, the method for managing a terminal and a base station can allocate more resources to terminals operated in an active mode while reducing a paging overhead by flexibly transmitting a paging message to the terminal in an idle mode of the femto base station by differently setting the paging group of the macro base station and the femto base station.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing a terminal operating in an idle state, the method comprising:
   entering, by the terminal operating in the idle state, a femto cell;
   determining, by the terminal operating in the idle state, whether a femto base station managing the femto cell has the same paging group as a macro base station managing a macro cell overlapping the femto cell;
   transmitting, by the terminal operating in the idle state, a first ranging code, triggering the femto base station to enter a paging enable state, to the femto base station before an idle mode timer ends if it is determined that the paging group is the same;
   transmitting, by the terminal operating in the idle state, a second ranging code for a location update after the idle mode timer ends if it is determined that the paging group is the same;
   transmitting, by the terminal operating in the idle state, the second ranging code for the location update to the femto base station before the idle mode timer ends if it is determined that the paging group is not the same; and
   receiving, by the terminal operating in the idle state, a paging message from the femto base station in the paging enable state,
   wherein the femto base station starts the paging enable state according to the first ranging code and the second ranging code received before the idle mode timer ends.

2. The method of claim 1, wherein the femto base station maintains the paging enable state according to the second ranging code received after the idle mode timer ends.

3. The method of claim 1, wherein:
   the determination is performed based on a paging group identifier.

4. A method for managing a femto base station managing a femto cell, the method comprising:
   receiving a first ranging code triggering a paging enable state from a terminal, before an idle mode timer of the terminal ends, operating in an idle state while entering the femto cell if the femto base station has the same paging group as a macro base station managing a macro cell overlapping the femto cell;
   receiving, from the terminal operating in the idle state, after the idle mode timer of the terminal ends, a second ranging code for a location update if it is determined that the paging group is the same;
   receiving, from the terminal operating in the idle state, before the idle mode timer of the terminal ends, the second ranging code for the location update to the femto base station if it is determined that the paging group is not the same;
   shifting the paging enable state according to the first ranging code or the second ranging code received before the idle mode timer of the terminal ends; and
   broadcasting a paging message to the terminal.

5. The method of claim 4, further comprising:
   activating a paging enable timer after receiving the first ranging code.

6. The method of claim 5, further comprising:
   shifting the paging enable state of the femto base station to a paging disable state after the paging enable timer ends.

7. The method of claim 5, further comprising:
   updating the paging enable timer according to the second ranging code received after the idle mode timer of the terminal ends.

8. A base station (BS) for managing a femto cell, the BS comprising:
   a ranging code receiver configured to:
      receive, from a terminal, a first ranging code triggering the base station to change from a paging disable state to a paging enable state, before an idle mode timer of the terminal ends, the terminal operating in an idle state while entering the femto cell, if the BS has the same paging group as a macro base station managing a macro cell overlapping the femto cell,
      receive, from the terminal operating in the idle state, after the idle mode timer of the terminal ends, a second ranging code for a location update if it is determined that the paging group is the same, and
      receive, from the terminal operating in the idle state, before the idle mode timer of the terminal ends, the second ranging code for the location update to the femto base station if it is determined that the paging group is not the same,
   wherein the BS is configured to change a state of the base station from the paging disable state to the paging enable state according to receiving the first ranging code before the idle mode timer of the terminal ends, and
   wherein the BS is further configured to broadcast a paging message to the terminal.

9. The BS of claim 8,
   wherein the BS is further configured to activate a paging enable timer, and
   wherein the BS is further configured to change the state of the base station to the paging disable state when the paging enable timer ends.

10. The BS of claim 8, wherein:
    the BS is further configured to maintain the paging enable state according to the second ranging code received after the idle mode timer of the terminal ends.

11. A terminal operating in an idle mode, the terminal comprising:
    a processor configured to determine whether a femto base station managing the femto cell into which the terminal, which is operating in the idle mode, enters has the same paging group as a macro base station managing a macro cell overlapping the femto cell;
    a ranging code transmitter configured to:
       transmit a first ranging code, triggering the femto base station to change from a paging disable state to a paging enable state, to the femto base station before an idle mode timer ends if it is determined that the paging group is the same as the determination result of the processor;

transmit, by the terminal operating in the idle state, a second ranging code for a location update after the idle mode timer ends if it is determined that the paging group is the same as the determination result of the processor; and transmit the second ranging code for the location update to the femto base station before the idle mode timer ends if it is determined that the paging group is not the same as the determination result of the processor; and a receiver configured to receive a paging message of the paging enable state from the femto base station, wherein the femto base station starts the paging enable state according to the first ranging code and the second ranging code received before the idle mode timer ends.

12. The terminal of claim 11, wherein:

the femto base station maintains the paging enable state according to the second ranging code received after the idle mode timer ends.

\* \* \* \* \*